United States Patent [19]

Frick et al.

[11] Patent Number: 5,083,091
[45] Date of Patent: Jan. 21, 1992

[54] CHARGED BALANCED FEEDBACK MEASUREMENT CIRCUIT

[75] Inventors: Roger L. Frick, Chanhassen; John P. Schulte, Eden Prairie, both of Minn.

[73] Assignee: Rosemount, Inc., Eden Prairie, Minn.

[21] Appl. No.: 175,627

[22] Filed: Mar. 30, 1988

Related U.S. Application Data

[63] Continuation of Ser. No. 885,178, Apr. 23, 1986, abandoned.

[51] Int. Cl.$^5$ .......................... G01R 27/26; G01R 9/12
[52] U.S. Cl. ..................................... 324/678; 324/679; 73/718; 73/724
[58] Field of Search .............. 324/60 CD, 60 C; 73/718, 719, 724, 725, 780

[56] References Cited

U.S. PATENT DOCUMENTS

| | | | |
|---|---|---|---|
| 3,518,536 | 6/1970 | Lee et al. | 324/57 |
| 3,564,923 | 9/1967 | Nudd, Jr. et al. | 73/398 |
| 3,657,926 | 4/1972 | Munson et al. | 73/404 |
| 3,731,072 | 5/1973 | Johnston | 235/151.3 |
| 3,820,095 | 6/1974 | Wojtasinski et al. | 340/200 |
| 3,869,676 | 3/1975 | Harrison et al. | 329/204 |
| 3,883,812 | 5/1975 | Harrison et al. | 329/166 |
| 3,896,374 | 7/1975 | Delafon | 324/60 C |
| 3,955,070 | 5/1976 | Suzuki et al. | 235/92 MT |
| 4,001,813 | 1/1977 | Kosakowski | 340/347 R |
| 4,054,833 | 10/1977 | Briefer | 324/60 C |
| 4,057,755 | 11/1977 | Piesche | 324/62 |
| 4,091,683 | 5/1978 | Delatorre | 73/718 |
| 4,093,915 | 6/1978 | Briefer | 324/60 R |
| 4,129,863 | 12/1978 | Gray et al. | 340/347 AD |
| 4,145,619 | 3/1979 | Tseng | 307/118 |
| 4,149,231 | 4/1979 | Bukosky et al. | 363/59 |
| 4,165,483 | 8/1979 | Holdren et al. | 324/60 C |
| 4,180,860 | 12/1979 | Driscoll et al. | 364/900 |
| 4,187,459 | 2/1980 | Wolfendale | 324/60 |
| 4,187,460 | 2/1980 | Dauge et al. | 324/60 CD |
| 4,187,718 | 2/1980 | Shibasaki | 73/52 |
| 4,193,063 | 3/1980 | Hitt et al. | 340/200 |
| 4,200,863 | 4/1980 | Hodges et al. | 340/347 AD |
| 4,232,300 | 11/1980 | Wright et al. | 340/840.39 |
| 4,242,665 | 12/1980 | Mate | 340/870.38 |
| 4,262,542 | 4/1981 | Freund, Jr. et al. | 73/861.12 |
| 4,322,775 | 3/1982 | Delatorre | 361/283 |
| 4,322,977 | 4/1982 | Sell et al. | 73/701 |
| 4,370,890 | 2/1983 | Frick | 73/718 |
| 4,381,677 | 5/1983 | Rusch et al. | 73/724 X |
| 4,386,312 | 5/1983 | Briefer | 324/60 C |
| 4,387,601 | 6/1983 | Azegami | 73/724 |
| 4,392,382 | 7/1983 | Myers | 73/708 |
| 4,398,426 | 8/1983 | Park et al. | 73/724 |
| 4,399,440 | 8/1983 | Douglas | 340/870.26 |
| 4,403,297 | 9/1983 | Tivy | 364/579 |
| 4,420,753 | 12/1983 | Meyer-Ebrecht | 340/870.26 |
| 4,434,451 | 2/1984 | Delatorre | 361/283 |
| 4,459,856 | 7/1984 | Ko et al. | 73/754 |
| 4,467,655 | 8/1984 | Lee | 73/724 |
| 4,494,183 | 1/1985 | Bayer et al. | 364/154 |
| 4,504,921 | 3/1985 | Nasuta et al. | 364/550 |
| 4,535,283 | 8/1985 | Rabinovich | 73/719 X |
| 4,550,295 | 10/1985 | Sasaki | 333/19 |
| 4,570,490 | 2/1986 | Antonazzi | 73/701 |
| 4,574,250 | 3/1986 | Senderowicz | 330/258 |
| 4,644,798 | 2/1987 | Tamura et al. | 73/708 |
| 4,663,168 | 12/1986 | Venema | 324/60 CD |
| 4,743,836 | 5/1988 | Grzybowski et al. | 324/60 |

FOREIGN PATENT DOCUMENTS 58-200119 11/1983 Japan.

OTHER PUBLICATIONS

Hauser, Max W. et al., "Circuit and Technology Considerations for MOS Delta-Sigma A/D Converters,"
(List continued on next page.)

Primary Examiner—Kenneth A. Wieder
Attorney, Agent, or Firm—Kinney & Lange

[57] ABSTRACT

A measurement circuit provides an output signal as a function of an input signal. The measurement circuit includes a charge generator which provides packets of charge as a function of the input signal to a measurement element. The measurement element measures the charge provided and provides a measurement signal as a function of the charge received. The measurement signal is coupled to a feedback circuit which couples to switches in the charge generator to control production of charge packets. The feedback circuit provides at least one output signal indicative of the quantity or number of charge packets provided.

49 Claims, 11 Drawing Sheets

OTHER PUBLICATIONS

1986 *IEEE International Symposium on Circuits and Systems*, May 5-7, 1986 (San Jose, CA) pp. 1310-1315.

Robert J. et al., "A Low-Voltage High Resolution CMOS A/D Converter with Analog Compensation," *CICC '86 Conference*, May 12-15, 1986.

"The Voltage-To-Frequency A/D Converter," *A/D-VISOR*, National Semiconductor Corporation, vol. 4, No. 1, Feb. 1984, pp. 7 and 8.

Williams, Jim, "Monolithic CMOS-Switch IC Suits Diverse Applications," *EDN*, Oct. 4, 1984, pp. 183-194.

Anderson, Tom and Bruce Trump, "Clocked v-f Converter Tightens Accuracy and Raises Stability," *Electronic Design*, Sep. 6, 1984, pp. 234-244.

"uA9706 Digital-To-Analog Converter Evaluation Demonstrator Board," *Fairchild*, 1979, pp. 2-17.

Andreiev, Nikita, "User Concern for Controller-To-Computer Link Delays Analog Signal Interface Phaseout," *Control Engineering*, vol. 29, No. 6, May 1982, pp. 82-85.

Deran, Charles, "A New Standard for Electronic D/P Transmitter Selection," *Instrument Society of America*, National Conference and Exhibit, Oct. 15, 1978, pp. 457-461.

Candy, James C., "A Use of Double Integration in Sigma Delta Modulation," *IEEE Transactions on Communications*, vol. Com-33, No. 3, Mar. 1985.

Rose, Craig D., "A New Way to Cut the Cost of A--to-D Converters," *Electronics*, pp. 42-44, Mar. 31, 1986.

Suarez, Ricardo E. et al., "All-MOS Charge Redistribution Analog-To-Digital Conversion Techniques-Part II," Reprinted from *IEEE J. Solid-State Circuits*, vol. SC-10, pp. 379-385, Dec. 1975.

Landsburg, George, "A Charge-Balancing Monolithic A/D Converter," Reprinted from *IEEE J. Solid-State Circuits*, vol. SC-12, pp. 662-673, Dec. 1977.

McCharles, Robert H. et al., "An Algorithmic Anolog-To-Digital Converter," Reprinted from *IEEE International Solid-State Circuits Conference Digest of Technical Papers*, pp. 96-97, 1977.

Gregorian, Roubik et al., "Switched-Capacitor Circuit Design," *IEEE*, vol. 71, No. 8, Aug. 1983.

Williams, Jim, "Digitize Transducer Outputs Directly at the Source," *EDN*, Jan. 10, 1985, pp. 201-208.

*IEEE Transactions on Industrial Electronics and Control Instrumentation*, vol. IECI-22, No. 3, Aug. 1975, pp. 430-432.

Preliminary Product Specification, National Semiconductors, HPC16140 Controller.

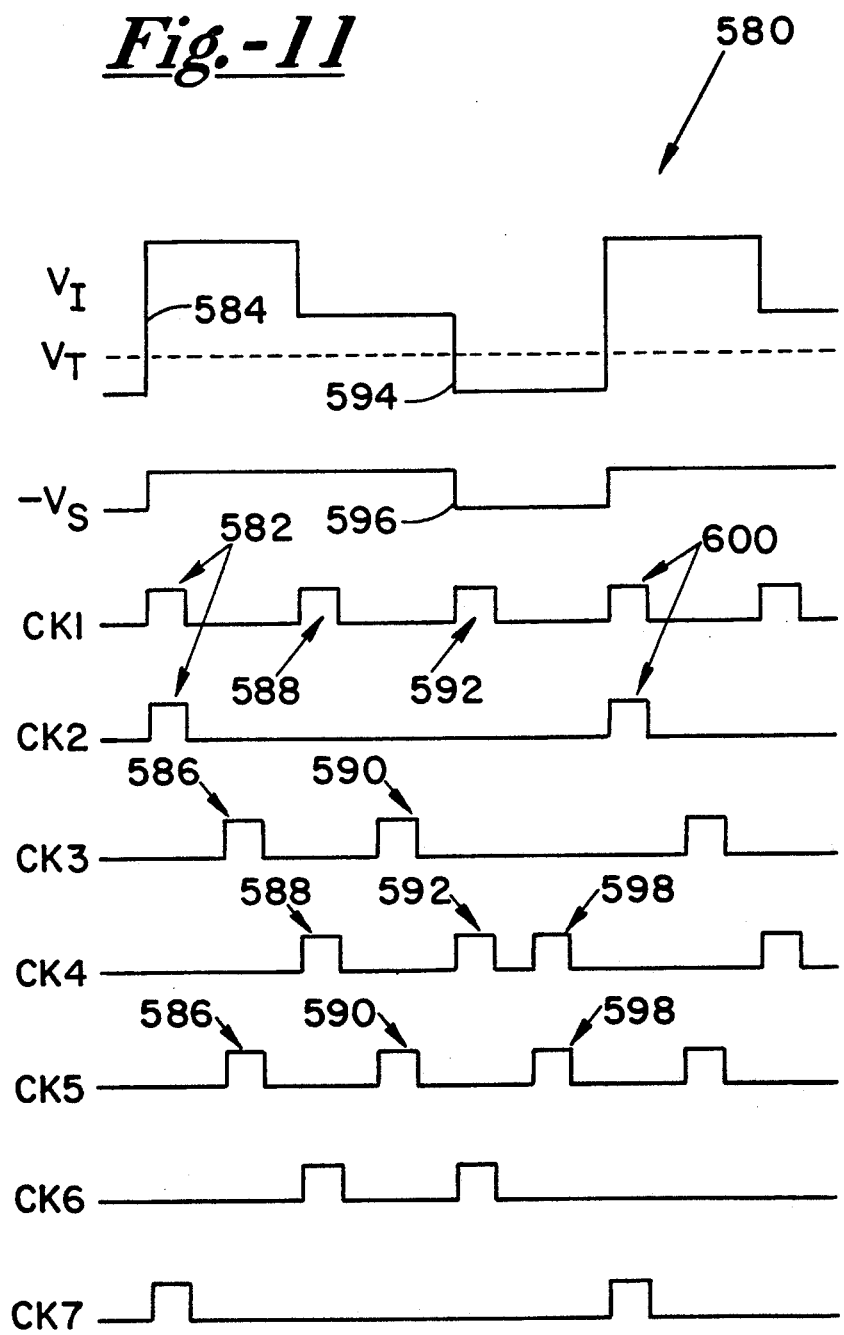

CHARGED BALANCED FEEDBACK MEASUREMENT CIRCUIT

This is a continuation of application Ser. No. 885,178, filed Apr. 23, 1986, now abandoned.

BACKGROUND OF THE INVENTION

1. Field of the Invention

This invention relates to a measurement circuit for measuring an input signal.

SUMMARY OF THE INVENTION

This invention relates to a measurement circuit for providing an output as a function of an input signal. The input signal is coupled to generating means which comprise reactance means for forming a quantity or number of charge packets. The generator means provide a generator signal that comprises the charge packets and are responsive to the input signal. The generator signal is coupled to measurement means which measure the generator signal, preferably by accumulating the charge packets as a function of the reactance means. The measurement means provide a measurement signal as a function of the generator signal. The measurement signal is coupled to feedback means which provide a feedback signal as a function of the measurement signal. The feedback signal is coupled to the generating means for controlling the generation of charge packets by the generating means. The feedback means further provide an output signal representative of the quantity or number of charge packets. The measurement circuit preferably comprises output means which count the quantity or number of charge packets to provide an analog output, a digital output, or a combined analog and digital output as functions of the input.

BRIEF DESCRIPTION OF THE DRAWINGS

FIG. 11 is a timing diagram corresponding to FIG. 10.

DETAILED DESCRIPTION OF THE PREFERRED EMBODIMENTS

Figure 1:
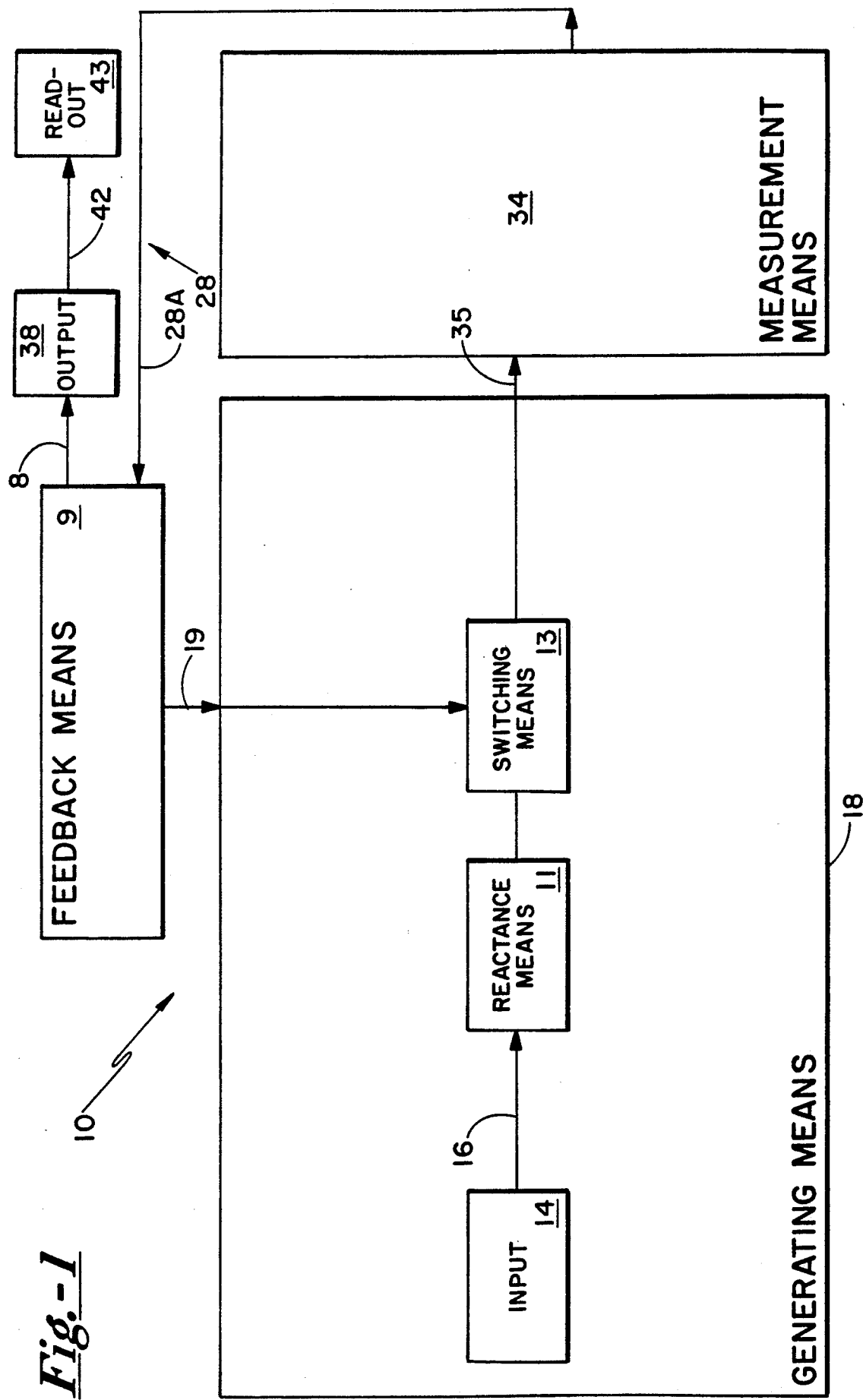
FIG. 1 is a diagram of a first embodiment of a transmitter according to this invention.

In FIG. 1, a first embodiment of a measurement circuit is indicated generally at 10. An input 14 provides a signal on line 16 such as a potential, a current, a pressure, a temperature, a flow, a pH level, or other variable to be sensed. Line 16, which can comprise multiple signal paths, couples input 14 to the generating means 18 to provide the generating means 18 with a signal or signals representative of the sensed variable. Line 16 of FIG. 1 can comprise multiple electrical conductors, a fiber optic cable, pressure passageways or other coupling means.

Generating means 18 comprises a reactance means 11, coupled to the input means 14, and a switching means 13, controlled by a feedback signal coupled on line 19 from a feedback means 9. The reactance means 11 is coupled to the switching means 13 for coupling a quantity or number of packets of electrical charge representative of the sensed parameter to a measurement means 34 on a line 35. The term "packet" refers to a discrete amount of electrical charge which flows to or from a capacitance when it is charged from a first potential to a second potential, different from the first potential. The amount of charge in a packet is proportional to the capacitance and the difference between the first and second potentials. The generating means 18 couples first charge packets having a first polarity and second charge packets having a second polarity opposite the first polarity on the line 35 to the measurement means 34. The measurement means 34 accumulates charge by subtracting the second charge packets from the first charge packets. When an accumulation of charge in the measurement means reaches a selected level, a measurement signal 28 is actuated and coupled back from measurement means 34 on line 28A to the feedback means 9 to control provision of the feedback signal on the line 19. The feedforward coupling of the first and second charge packets on line 35 to the measurement means 34 and the feedback coupling of the measurement signal on line 28A and the feedback signal on line 19 to the generating means 18 causes a cyclic operation of the measurement signal 28. In response to an actuation of the measurement signal on line 28A, the feedback means 9 actuates the feedback signal on line 19 which, in turn, actuates switching means 13 to provide a charge packet or packets representative of the sensed parameter to the measurement means 34 on line 35. The first charge packets coupled on line 35 increases the accumulation of charge in measurement means 34. The second charge packets coupled on line 35 reduce the accumulation of charge in the measurement means 34. The second charge packets can have a substantially fixed amplitude or can alternatively be representative of the sensed parameter. When the charge accumulated in the measurement means 34 is thus balanced over time to a selected level, the measurement means 34 again actuates the measurement signal 28. A quantity or number of packets of charge needed to return the accumulation to the selected level is representative of the parameter. There is a charge balancing interaction between the generating means 18, the measurement means 34 and the feedback means 9. A quantity or number of charge packets of the first polarity unbalance the accumulation of charge in the measurement means 34 and then a quantity or number of charge packets of the second polarity are applied to the measurement means 34 until the charge in the measurement means is brought back into balance at the selected level at which point the measurement signal 28 is actuated. The quantities or numbers of charge packets of the first and second polarities is representative of the sensed parameter. The accumulation of charge in the measurement means 34 is preferably continuous and not periodically zeroed. Thus an accumulation of charge packets which exceeds the amount required to balance the accumulation in the measurement means 34 is carried forward to the next measurement interval. This carrying forward of charge improves accuracy over several measurement cycles. A long term average value of the number of charge packets tends toward an accurate value representative of the sensed parameter because small accumulations of charge packets in the measurement means 34 are not zeroed out and lost at the end of a measurement period, but are instead carried forward to affect a succeeding measurement interval.

An output signal indicative of the number of first and second charge packets provided over time is coupled on line 8 to an output means 38 which couples a signal representative of the parameter to a readout means 43 along line 42. Control of the output means 38 is thus a function of the quantity or number of packets of charge which is representative of the parameter. The output means 38 can simply couple the output signal on line 18 to the readout 43, thereby providing a signal on line 42 representative of the parameter. Alternatively, the output means 38 can receive the output signal on line 8 and be a means for producing an analog output, a serial digital output, or a combined analog and digital output.

Figure 2:
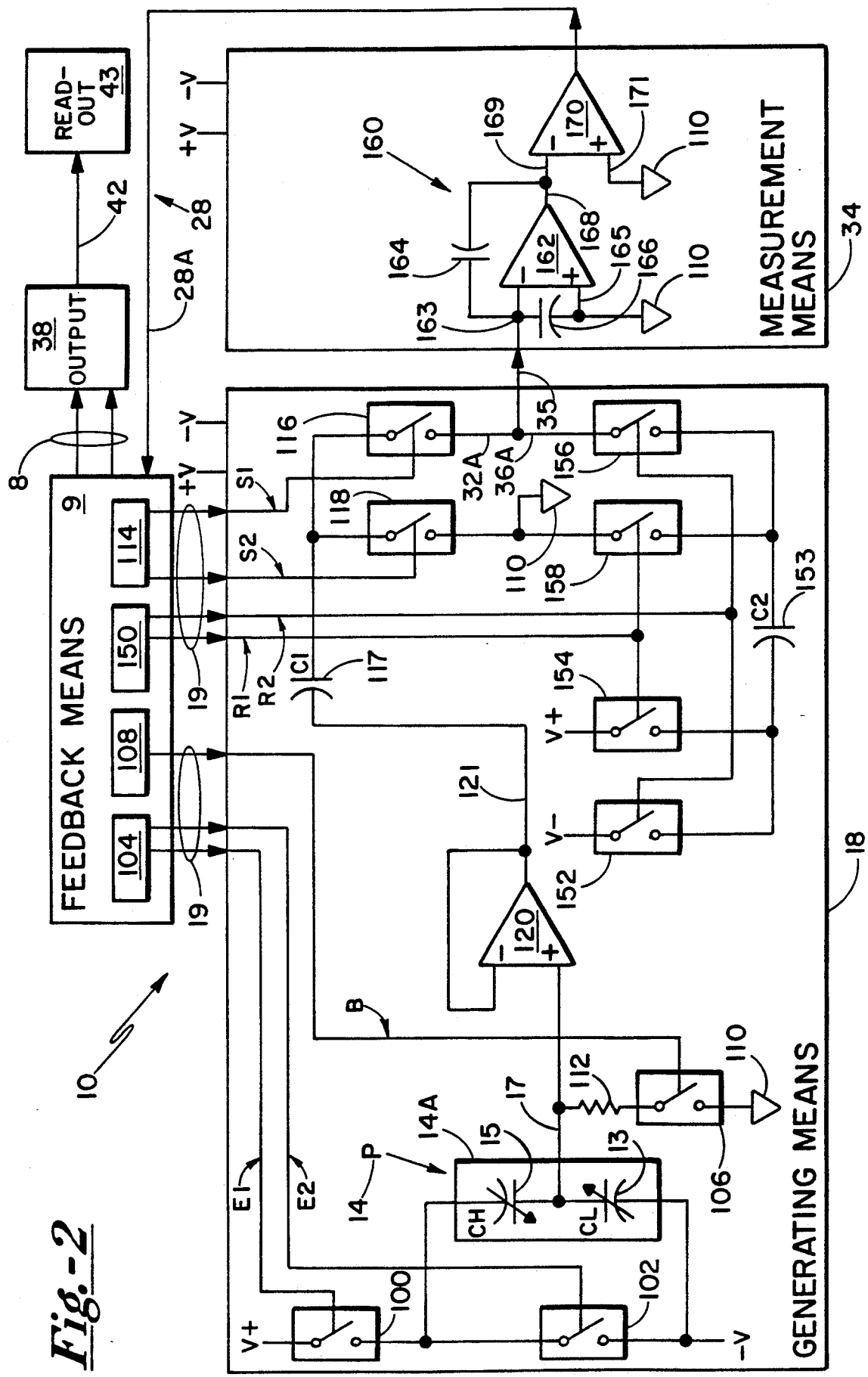
FIG. 2 is a diagram of a second embodiment of a transmitter for use with a capacitive sensor.

In FIG. 2, an embodiment of a capacitive pressure transmitter corresponding to FIG. 1 is shown. Reference numbers in FIG. 2 that are the same as the reference numbers in FIG. 1 identify corresponding features.

In the embodiment of FIG. 2, a capacitive pressure transducer 14A senses a pressure P indicated at 14 and provides variable capacitor 15 having a capacitance CH and a variable capacitor 13 having a capacitance CL each representative of pressure. The generating means 18 receives signals E1 and E2 from a feedback means 9 for controlling switches 100 and 102 to provide excitation to the sensor 14A.

The input 14 is coupled to the generating means 18 by line 121 to provide a signal representative of the sensed pressure P to generating means 18. An excitation logic circuit 104, a bias logic circuit 108, and a sensor logic circuit 114 each receive the measurement signal 28. The circuits 104, 108 and 114 provide signals E1, E2, B, S1 and S2 to the control inputs or gates of switches 100, 102, 106, 116 and 118 respectively and these switches are preferably MOS transmission gates. These MOS transmission gates are designed to have a structure which provides for very low leakage currents when they are open and which transfers a minimal amount of parasitic charge from the gate when switched. Desired MOS transmission gate characteristics are a leakage current of less than 1 pico ampere in an "off" state and a charge transfer of less than 0.05 pico coulombs when switched. Each of the switches is closed to couple signals by application of a high or "1" level, and is opened to stop coupling signals by application of a low or "0" level to the control input or gate of the switch. Switches 100 and 102 are closed sequentially in a non-overlapping manner to couple reference potentials $+V$ and $-V$ to transducer 14A providing desired excitation to transducer 14A. Switch 106 is closed periodically to couple the line 17 to DC common reference potential 110 through resistance 112 thereby adjusting a DC bias on amplifier 120 to a desired level. Amplifier 120 senses a transducer signal at a high impedance input coupled to line 17 and couples a signal representative of the sensed parameter from a low impedance output 121 to a capacitor 117 having a capacitance C1. Sensor logic circuit 114 in feedback means 9 controls switches 116 and 118 to couple a charge packet representative of the sensed parameter from capacitor 117 to line 32A. One such charge packet is generated on line 32A in response to each actuation of the measurement signal 28. A flow of charge on line 32A is thus proportional to the sensed pressure P, to the number of applications of actuations of measurement output 28, to a reference potential coupled to sensor 14, and to the capacitance C1.

In feedback means 9, a reference logic circuit 150 provides signals R1 and R2 for controlling switches 152, 154, 156 and 158 as shown in FIG. 2. Firstly, switches 154 and 158 are closed thereby coupling capacitor 153 between reference potentials $+V$ and DC common and storing a charge on a capacitor 153 having a capacitance C2 while switches 152 and 156 are open. Secondly, switches 152 and 156 are closed coupling capacitor 153 between reference potential $-V$ and line 36 while switches 154 and 158 are open and a packet of charge is thus discharged into line 36A. This switching sequence is continuously repeated to provide an average flow of charge or current on line 36A proportional to a reference potential, to the capacitance C2 of capacitor 153 and, to the frequency of the actuation of switches 154 and 158.

The first signal on line 32A and the second signal on line 36A in FIG. 1B are of opposite polarity so that the first signal charges an integrator 160 in a first direction and the second signal charges the integrator 160 in a second direction opposite the first direction. The two signal on lines 32A and 36A are effectively subtracted at the integrator 160 because they have opposite polarities. The integrator 160 comprises an amplifier 162 having high impedance inputs 163 and 165 and an integrator capacitor 164 coupling between an output 168 of amplifier 162 and the inverting input 163 of amplifier 162. A noise bypass capacitor 166 is coupled from the inverting input 163 to a non-inverting input 165 of amplifier 162 which is also coupled to DC common 110. The integrator 160 accumulates charge packets coupled on lines 32A and 36A and provides an integrator signal at integrator output 168 that is representative of the charge accumulated. Integrator signal 168 is coupled to an inverting input 169 of comparator 170; a non-inverting input of comparator 170 is coupled to a reference potential, preferably DC common 110. The comparator 170 compares the level of the integrator signal 168 to the reference potential 110 and provides the measurement signal 28 to line 28A indicative of the polarity of integrator signal 168 with respect to the reference potential 110.

A flow of charge Q1 in the first signal 32 on line 32A is substantially $$Q1 = \frac{(N1)(C1)(VR)}{2}\left(1 - \frac{CH - CL}{CH + CL}\right) \qquad \text{Eq. 1}$$

where:
Q1 is a total flow of charge on line 32A during a time interval T;
N1 is the quantity or number of charge packets on line 32 in the time interval T;
C1 is the capacitance of capacitor 117;
VR is the potential difference between reference potentials $+V$ and $-V$ applied to switches 100 and 102;
CH is a capacitance of pressure sensing capacitor 15; and CL is a capacitance of pressure sensing capacitor 13. The flow of charge Q2 on line 36A is substantially $$Q2 = (N2)(C2)(VR) \qquad \text{Eq. 2}$$

where:
Q2 is a total flow of charge on line 36A during the time interval T;
N2 is the quantity or number of charge packets on line 36 during the time interval T;
F2 is a frequency at which circuit 150 actuates switches 152 and 156;
C2 is the capacitance of capacitor 153; and
VR is the potential difference between reference potentials $+V$ and $-V$ applied to switches 152 and 154.

The integrator 160 is repetitively rebalanced so that no net charge accumulates on the integrator over a series of cycles of the measurement signal 28 during the time interval T. Hence, the charge Q1 is controlled to equal substantially the charge Q2. Combining the above equations 1 and 2 for Q1 and Q2, with Q1=Q2 discloses the following relationship:

$$N2 = \frac{(N1)(C1)}{2(C2)} \left(1 - \frac{CH - CL}{CH + CL}\right) \qquad \text{Eq. 3}$$

The Equation 3 above shows that N2 is substantially dependent only on capacitances and the number of charge packets N1. The number N1 can be held constant by counting the number of pulses N2 over a constant number N1 of pulses making N2 a function of CH and CL. Both signals 32 and 36 are proportional to the same reference potential VR, but this reference potential term VR is cancelled out in the above equation 3 defining a number of charge packets that is substantially independent of the reference potential over an operating range. Capacitances C1 and C2 can be selected to have substantially matched temperature characteristics, so that variations with temperature of C1 in the numerator are cancelled out by similar variations with temperature of C2 in the denominator of the above equation making the number of pulses N2 insensitive to the temperature of transmitter circuitry. The number of pulses N2 is also substantially independent of the selected level applied to the comparator over an operating range. Hence, the selected level can be the reference potential $-V$ instead of the DC common level shown when amplifiers 120, 162 and comparator 170 are designed to operate at levels near the $-V$ reference potential. The term ((CH−CL)/(CH+CL)) in the above equation is proportional to the pressure P applied to transducer 14A. Hence it can be seen that the number N2 is dependent on the pressure P and can be substantially independent of the reference potentials and ambient temperature of the transmitter over an operating range.

Figure 3:
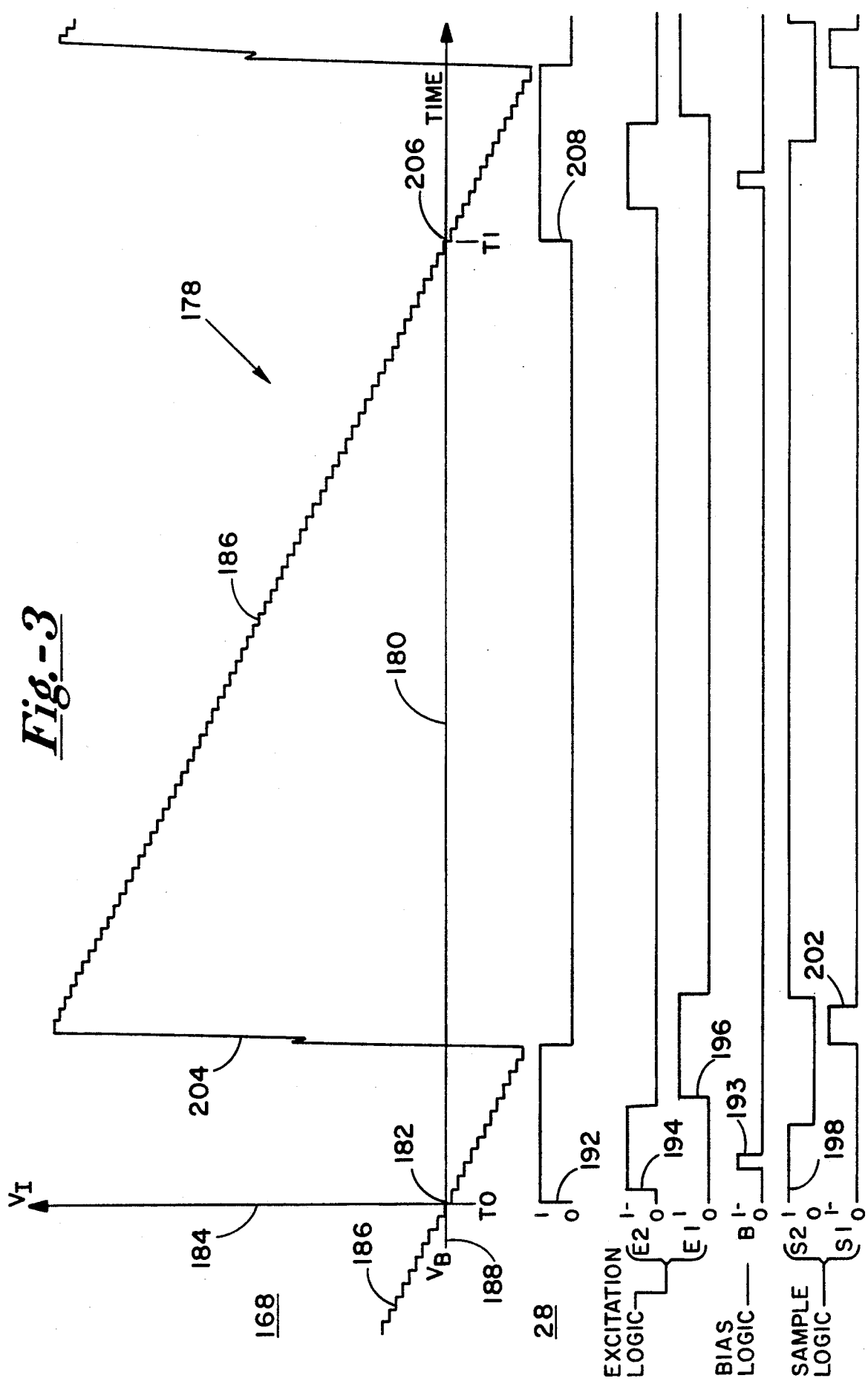
FIG. 3 is a timing diagram corresponding to FIG. 2.

In FIG. 3, timing relationships between the integrator signal 168, the measurement signal 28 and the signals E1, E2, B, S1, S2 of FIG. 2 are shown in a timing diagram 178. A first axis 180 represents time starting from a time T0 shown at 182. A second axis 184 represents a level 186 of the integrator signal 168 and a selected level 188 applied to the non-inverting input 171 of comparator 170. The application of packets of charge from line 36A to the integrator 160 causes the integrator signal level 186 to be stepped in a negative direction until the integrator signal level 186 reaches the selected threshhold level 188 at time T0 at 182. Comparator 170 senses that the integrator signal level 186 has reached the selected threshhold level 188 and actuates the measurement signal on line 28A as shown at 192 in FIG. 3. The measurement signal on line 28A actuates the circuits 104, 108, and 114 to provide signals E1, E2, B, S1 and S2 as shown in FIG. 3. Firstly, signal E2 is actuated as shown at 194 to close switch 102 and discharge the series combination of pressure sensing capacitors 13 and 15. While switch 102 is closed, signal B is actuated as shown at 193 to close switch 106, adjusting the bias at the junction of capacitors 13 and 15 to substantially the DC common level 110. Signal S2 shown at 198 has held switch 118 closed during this time to charge capacitor 117 to a first level of a signal on line 121. After switches 102, 106 and 118 are opened, signal E1 is actuated as shown at 196 to charge the series combination of pressure sensing capacitors 13 and 15 to the reference potential. The series combination of capacitors 13 and 15 operates as a capacitive potential divider and the potential provided by the sensor 14A on conductor 17 is determined by pressure sensitive capacitances CH and CL and hence the potential on conductor 17 is representative of pressure. Amplifier 120 provides a buffered output to capacitor 117 substantially equal to the potential on conductor 17. Finally, signal S1 closes switch 116 as shown at 202 and a packet of charge representative of the parameter flows on line 32A to the integrator 160 from capacitor 117. The flow of charge on line 32A may be seen as a flow of positive charge from the integrator 160 to the capacitor 117 or alternatively may be seen as a negative flow of charge from the capacitor 117 to the integrator 160. The integrator output level is increased as shown at 204 by the application of the charge packet from the line 32A. This application of charge from the line 32A is then balanced out by application of charge from the line 36A until time T1 shown at 206 when the measurement signal is again actuated as shown at 208 and the cycle is repeated.

Figure 4:
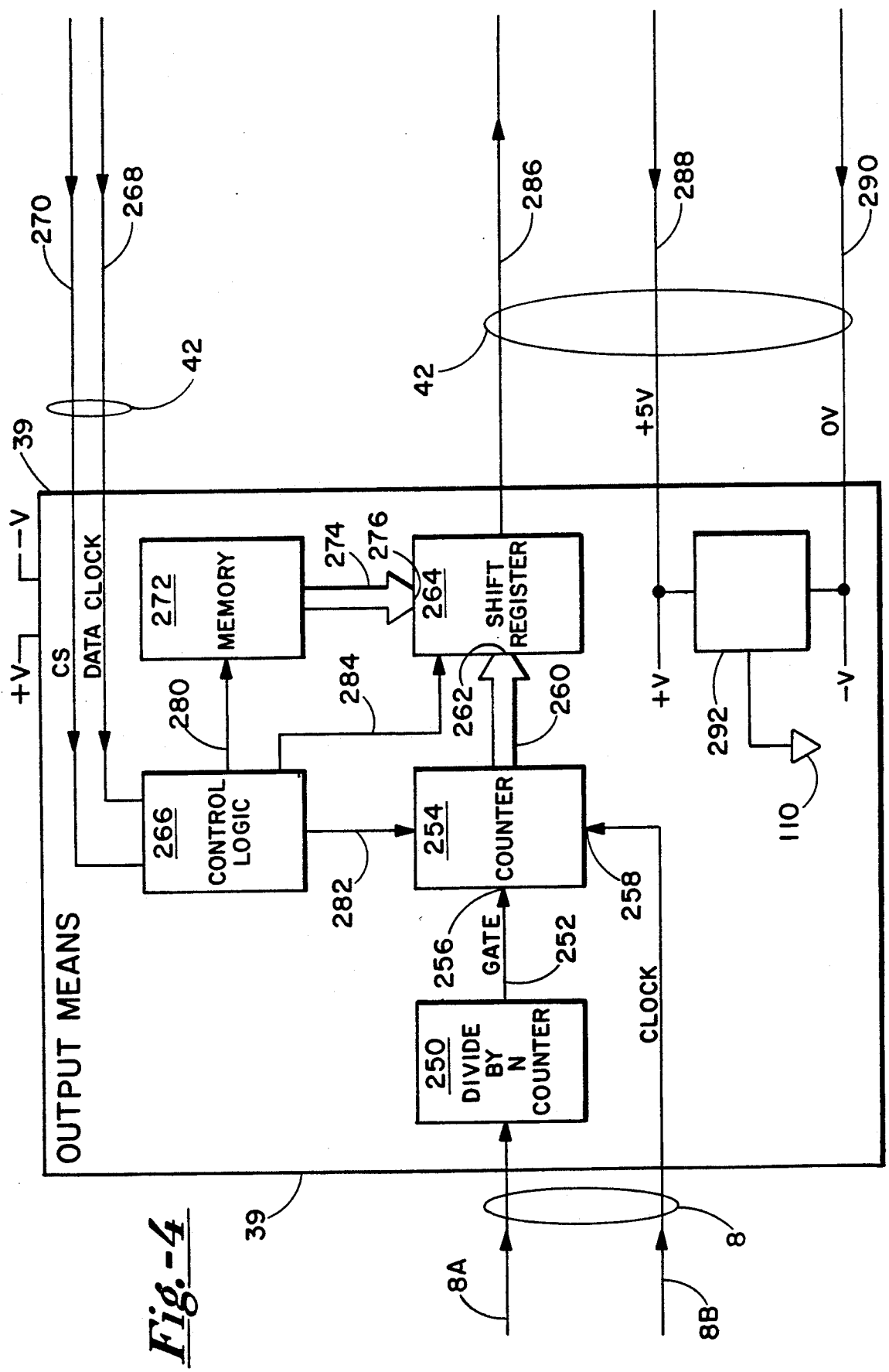
FIG. 4 is a diagram of a first embodiment of an output means according to this invention.

In FIG. 4, an embodiment of output means 38 corresponding to FIG. 2 is shown. Output means 38 receives signals on line 8 representative of the numbers N1 and N2 and provides a transmitter output signal to an output bus 42 compatible with a standardized serial digital data bus. In the embodiment shown in FIG. 4, the feedback means 9 provides a pulse signal representative of the quantity or number (N1+N2) of charge packets of both polarities to line 8B and a pulse signal representative of the number N1 of charge packets of the first polarity to line 8B.

In FIG. 4, the signal on line 8A is coupled to a divide-by-N counter 250 which provides a gating signal 252 having a period longer than the signal on line 8B. The gating signal 252 is applied to a gating input 256 of a counter 254 to gate counting of the signal on line 8B applied to a clocking input 258 of the counter 254. The counter 254 provides a multibit digital word on a parallel data bus 260 which is representative of the sensed pressure. The digital word on the data bus 260 is accepted by a first parallel input port 262 of shift register 264. A control logic circuit 266 receives a data clock signal on line 268 and a chip select signal "CS" on line 270 from the output bus 42. A memory 272 is a laser programmed memory which is programmed to contain data characterizing the sensor 14A and the transmitter 10. Such characterizing data may include linearity constants, identification numbers, and span and zero temperature coefficients of the sensor 14A. Data stored in memory 272 is transferred via parallel bus 274 to a second parallel input port 276 of shift register 264. When actuated by a signal on chip select line 270, the control logic circuit controls memory 272 via line 280 and counter 254 via line 282 to provide parallel data representing the sensed parameter and the characterization data to shift register 264. Control logic circuit 266 then controls shift register 264 via line 284 to shift the data in the shift register serially out on line 286 in synchronization with the data clock signal on line 268. A serial data word is coupled out on line 286 which contains data representative of the sensed parameter and data representative of the characterization constants stored in memory 272.

Lines 288 and 290 provide a 5 volt supply and reference potential from the data bus to the transmitter. Bandgap reference 292 is energized from lines 288 and 290 to provide a DC commom reference potential 110 to circuitry in transmitter 10. Substantially all of the circuitry of transmitter 10 is fabricated as an MOS integrated circuit to provide desired low power consumption. Transmitter 10 is preferably energized by a two-wire, 4-20 mA industrial control current loop. Lines 268, 270, 286, 288 and 290 comprise a 5-wire output bus 42 compatible with a microprocessor-based, loop-powered instrument.

Figure 5:
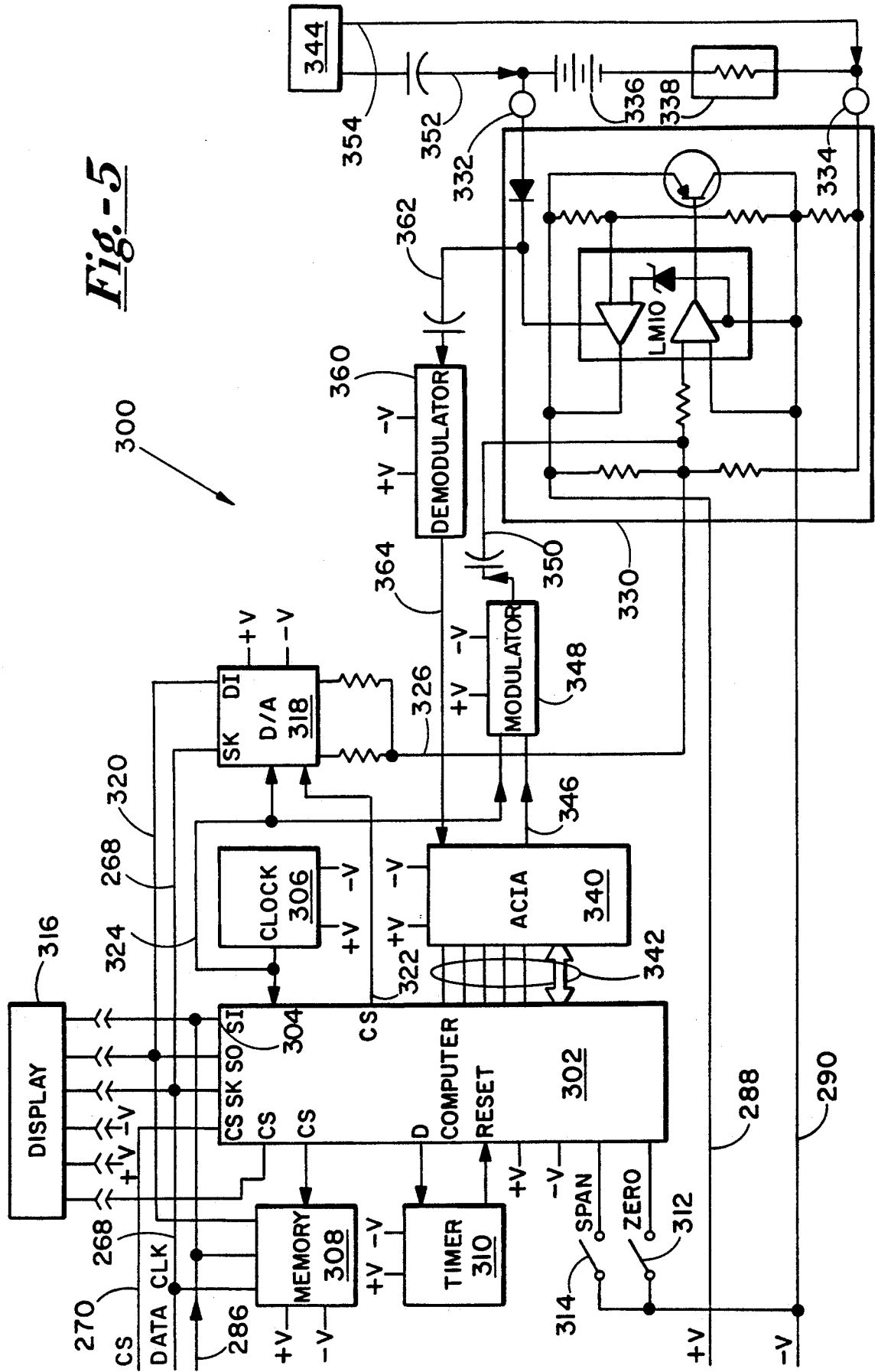
FIG. 5 is a diagram of a second embodiment of an output means according to this invention.

In FIG. 5, a circuit 300 is shown which can couple via lines 270, 268, 286, 288 and 290 to the five wire output bus 42 shown in FIG. 4. Circuit 300 together with the circuit of FIG. 4 can comprise an output means for providing an analog output or a combined analog and digital output. A computing means 302, preferably comprising a microcontroller type COP444C manufactured by National Semiconductor Corporation, receives a serial data word at a serial input 304 from line 286 of data bus 42 in response to actuation of chip select line 270 by the computing means 302 and in synchronization with the data clock signal on line 268. A clock means 306, a memory means 308 and a timer means 310 are coupled to the computing means 302 to support operation of the computing means. Memory 308 comprises a non-volatile memory storing alterable constants which control transmitter characteristics such as span and zero, or sensor characteristics received from memory 272 of FIG. 4. Timer 310 is a so-called "watchdog" timer which senses when computing means 302 has ceases to provide a signal indicative of normal operation for a selected timed interval and provides a reset signal to the computing means 302 when such failure occurs. Switch 312 can be manually actuated to provide a signal to computing means 302 setting a transmitter output characteristic to a "zero" level. Switch 314 can be manually actuated to provide a signal to computing means 302 setting a transmitter output characteristic to a full scale or "span" level. Display 316 is connectable to computing means 302 to receive and display data from computing means 302, particularly a current value of the sensed parameter 12. Clock 306 preferably comprises a crystal oscillator for clocking the operation of computing means 306 and other portions of the output circuit.

A data word representative of the sensed parameter received from line 286 and constants stored in memory means 308 are input data to computing means 302 for computing an output word representative of the sensed parameter. The output word representative of the sensed parameter is coupled by the computing means from its serial output 316 to digital-to-analog converter 318 along line 320. Computing means 302 selects converter 318 to receive the output data word by actuation of a chip select output on line 322. The clock 306 is coupled to the converter 318 via line 324 and the data clock signal from computing means 302 is also coupled to the converter 318 via line 268 to support operation of converter 318. The converter 318 preferably comprises a type 9706 manufactured by Fairchild semiconductor. Converter 318 couples an analog output representative of the sensed parameter on line 326 to regulator circuit 330. Regulator circuit 330 receives the analog output representative of the sensed parameter on line 326 and controls a 4-20 mA output current representative of the sensed parameter at terminals 332 and 334. The regulator circuit 330 is excited by the 4-20 mA output current and provides a regulated 5 volt supply and reference potential on conductors 288 and 290 for energizing the circuitry shown in circuit 300 and the circuitry shown in FIGS. 2 and 4.

The 4-20 mA output current at terminals 332 and 334 is energized by an energization source 336 connected in series with a current readout means 338 as shown in FIG. 5.

The computing means 302 can also couple to an ACIA or asynchronous communication interface adapter 340 via lines 342 to provide two-way digital communication between the computing means 302 and a digital communications device 344 which is connectable to the 4-20 mA current loop as shown in FIG. 5. The ACIA preferably comprises a type HD6350 manufactured by Hitachi. The ACIA 340 couples a serial data word along line 346 to a modulator which provides an FSK or frequency shift keyed serial output coupled on line 350 to the regulator circuit 330. The regulator circuit superimposes the FSK signal on the 4-20 mA output at terminals 332 and 334. The FSK serial signal is then coupled along lines 352 and 354 to a device 344 which demodulates and decodes the serial signal to provide a readout of data from computing means 302. The FSK signal superimposed on the output current loop is selected to have a high enough modulation frequency and a low enough amplitude compared to the 4-20 mA signal such that it does not substantially interfere with current measurement in the current loop.

The device 344 can also couple a FSK serial data signal representative of a command from serial communication device 344 along lines 352 and 354 to the regulator 330. This signal representative of a command is then coupled from regulator 330 to demodulator 360 along line 362. Demodulator 360 demodulates the command signal and provides a serial command signal to the ACIA 340 along line 364. The ACIA 340 receives the serial command signal from line 364 and provides this command to computing means 302 via bus 342. The command signal received from device 344 can be used by computing means 302 to alter the operation of the transmitter 10.

Figure 6:
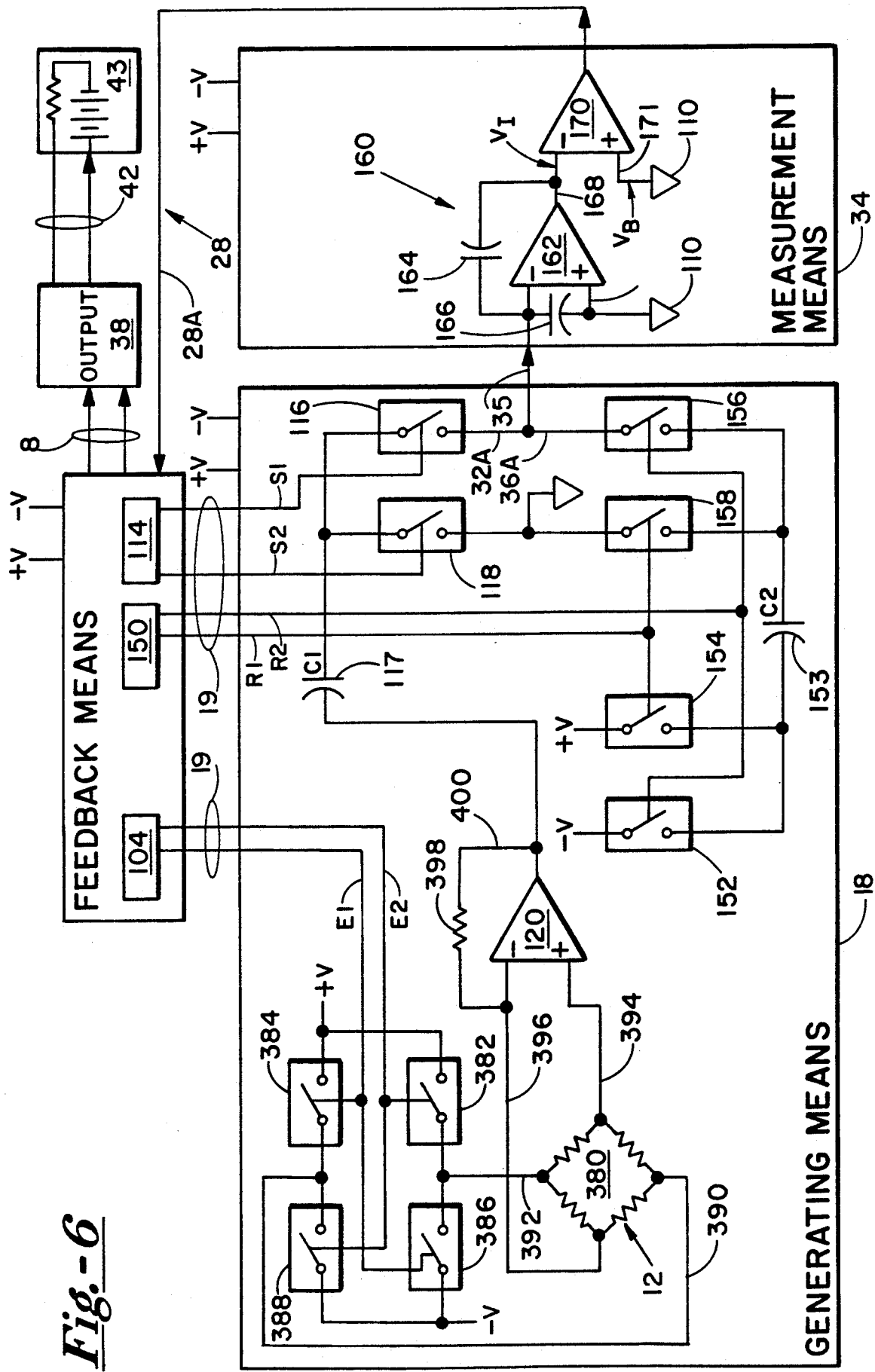
FIG. 6 is a diagram of a third embodiment of a transmitter for use with a resistive bridge sensor.

In FIG. 6, an alternate embodiment of the circuitry shown in FIG. 2 is shown. Reference numbers in FIG. 6 that are the same as reference numbers in FIG. 2 identify corresponding features. In FIG. 6, a sensor 14 comprises a resistive bridge transducer circuit 380 of conventional design responsive to the process parameter 12. Resistive bridge circuit 380 can comprise a strain gauge pressure sensor sensing a process pressure which can be alternatively a gauge pressure, an absolute pressure or a differential pressure. Alternatively, bridge circuit 380 may comprise a resistive bridge comprising a temperature sensitive resistor for sensing a process temperature. Bridge circuit 380 is excited by switches 382, 384, 386 and 388 which connect the bridge circuit to the supply potential +V and −V via conductors 390 and 392. The bridge 380 provides a signal representative of the sensed parameter coupled on lines 394 and 396 to amplifier 120. A feedback resistance 398 controlling the gain of amplifier 120 is coupled to amplifier 120 via lines 396 and 400. The feedback resistance 398 is preferably disposed adjacent to bridge 380 such that the feedback resistance 398 and at least a portion of bridge 380 can be matched in temperature and temperature coefficient of resistance to minimize undesired effects of an ambient temperature on the bridge.

Other portions of the circuitry in FIG. 6 operate analogously as described in connection with FIGS. 2 and 3 above. A first signal on line 32A is generated and provides a packet of charge representative of the sensed parameter in response to each actuation of a measurement signal 28. A second signal on line 36A is generated and provides packets of charge as controlled by the feedback means 9. Measurement means 34 in FIG. 6 accumulates charge from lines 32A and 36A and provides a measurement signal on line 28A representative of the sensed parameter 12. Measurement signal 28 is coupled on line 28A back to feedback means 9 in FIG. 6 to control generation of charge packets on line 32A.

Figure 7:
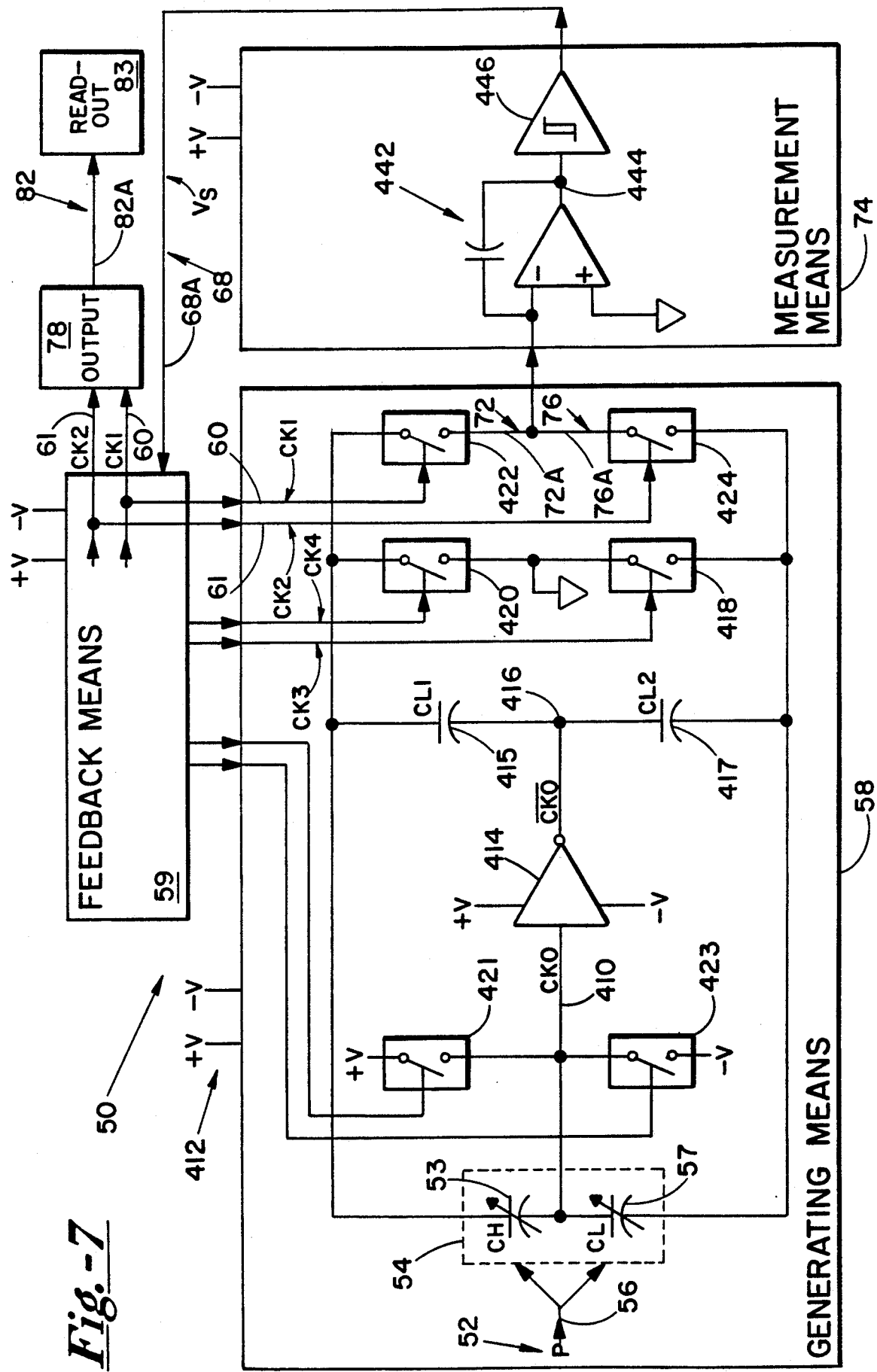
FIG. 7 is a diagram of a fourth embodiment of a transmitter according to this invention.

In FIG. 7, an embodiment of a transmitter is indicated generally at 50. A parameter 52 such as a pressure is coupled along a passageway 56 to sensor 54. The sensor 54 can be disposed in transmitter 50 or alternatively can be located remotely from transmitter 50 to provide remote sensing.

Generating means 58 generates a first signal 72 on line 72A which is representative of the parameter 52. The first signal 72 on line 72A provides charge packets comprising an amount of charge representative of the parameter 52 during a first time interval controlled by the feedback means 59. Generating means 58 also generates a second signal on line 76A which is representative of the parameter 52. The second signal on line 76A provides charge packets comprising an amount of charge representative of the parameter 52 during a second time interval, different from the first time interval, controlled by the feedback means 59. A first packet of charge provided by the first signal 72 has a first polarity and the amount of charge in such first packet increases with an increase in the sensed parameter 52. A second packet of charge provided by the second signal 76 has a second polarity, opposite the first polarity and the amount of charge in such second packet decreases with an increase in the sensed parameter 52.

A measurement means 74 accumulates charge from the signals on lines 72A and 76A. When the accumulation of charge from the first signal on line 72A in the measurement means 74 increases to a first selected level during the first time interval, the measurement signal 68 on line 68A is actuated in a first direction. The measurement signal 68 is coupled back to the feedback means 59 and the feedback means 59 responds to such actuation by ending the first time interval and starting the second time interval. During the second time interval, the measurement means 74 accumulates charge from the second signal 76 until the accumulation of charge decreases to a second selected level, different from the first selected level. When the second selected level is reached, the measurement signal 68 is actuated again in a second direction opposite the first direction. The actuation in the second direction is sensed by the feedback means 59 and the feedback means 59 responds to such actuation by ending the second time interval and starting another first time interval.

The feedforward coupling of signals on lines 72A and 76A from the generating means 58 to the measurement means 74 and the feedback coupling of the measurement signal 68 to the feedback means 59 and the generating means 58 causes a cyclic operation of the measurement signal 68. The generating means 58 and the feedback means 59 and the measurement means 74 operate together in a closed loop configuration to provide quantities or numbers of charge packets which are representative of the sensed parameter.

In FIG. 7, feedbck means 59 comprises digital circuitry which receives the measurement signal 68 and provides pulsed signals on lines 60 and 61 that are representative of the numbers qr quantities of charge packets provided by the generating means 58. Pulsed signal 60 provides pulses during the first time interval. Pulsed signal 61 provides pulses during the second time interval.

Output means 78 receives the pulsed signals 60 and 61 and counts a number of pulses received from signal 60 during a measurement time interval controlled by a total number of pulses received from both signals 60 and 61. The number of pulses thus counted is representative of the sensed parameter, and output means 78 provides an output signal 82 on line 82A comprising a signal representative of this count of pulses and thus the parameter. The output 82 is coupled to a readout 83 which indicates a current value of the sensed parameter 52.

Figure 8:
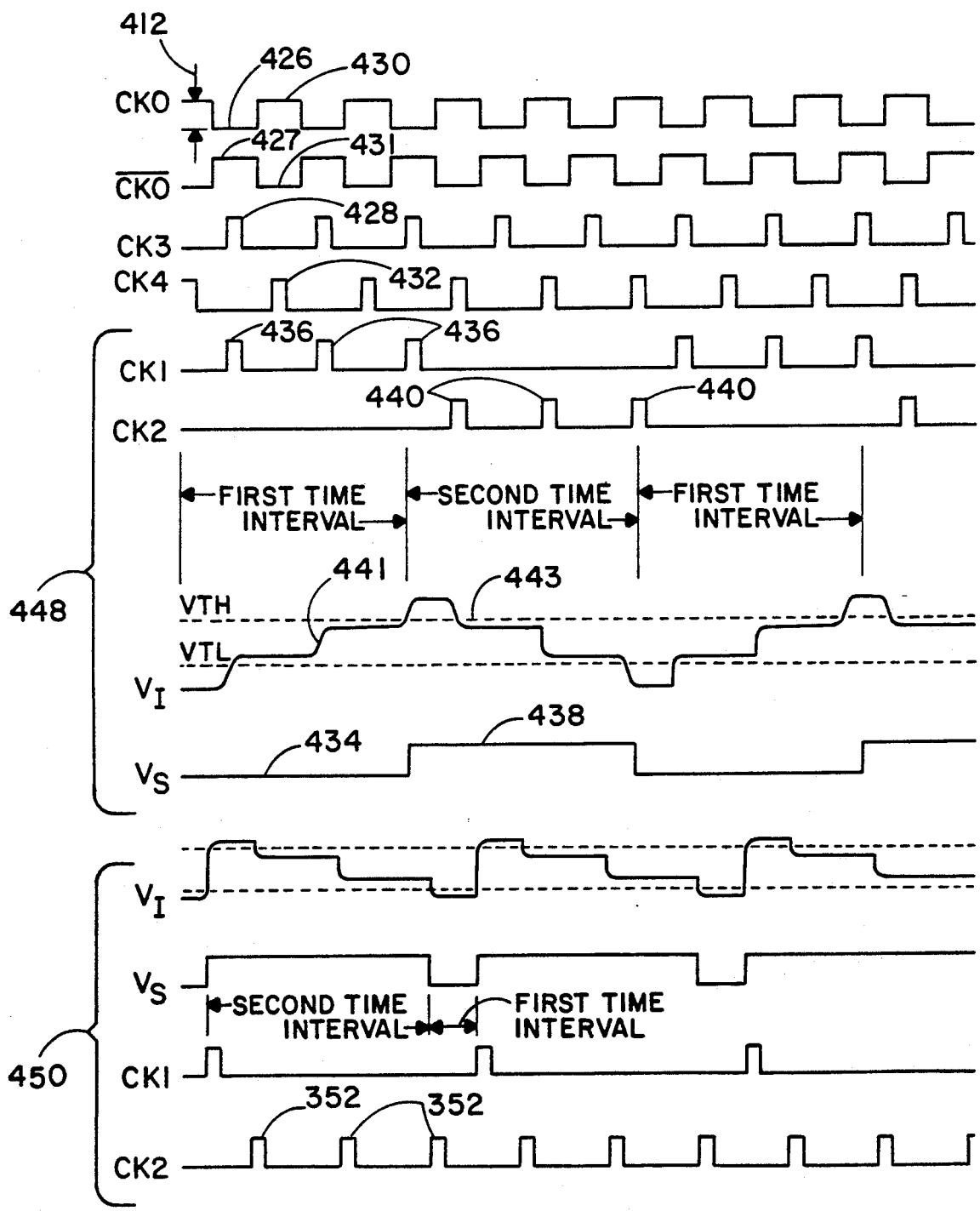
FIG. 8 is a timing diagram corresponding to FIG. 7.

In FIG. 7, the capacitive sensor 54 comprises capacitances 53 and 57 dependent on the applied pressure P at 52. A feedback means 59 comprises an MOS digital logic circuit which receives the measurement signal 68 and controls switches 421 and 423 to couple an excitation signal CK0 to the sensor 54 along line 410. The excitation signal CK0 from line 410 is generated from switches 421 and 423 coupled to the reference potentials +V and −V as shown in a timing diagram shown in FIG. 8, and has an amplitude substantially equal to a reference potential shown at 412. An inverter 414 receives the signal CK0 on line 410 and generates an inverse signal $\overline{CK0}$ which is coupled to linearity correction capacitances 415 and 417 along line 416. Referring now to FIGS. 7 and 8, the feedback means 59 also produces signals CK1, CK2, CK3 and CK4, as shown, for controlling actuation of switches 422, 424, 418 and 420 respectively and these switches are preferably MOS type switches as described above.

While the excitation signal CK0 is at a lower level as shown at 426 in FIG. 8, and the excitation signal $\overline{CK0}$ is at a high level as shown at 427, the signal CK3 is actuated for a time as shown at 428 to close switch 418 to conduct, thereby storing desired charges on sensing capacitance 57 and linearity correction capacitance 417.

While the excitation signal CK0 is at a higher level as shown at 430, and the excitation signal $\overline{CK0}$ is at a lower level as shown at 431, the signal CK4 is actuated for a time as shown at 432 to close switch 420, thereby storing desired charges on sensing capacitor 53 and linearity correction capacitor 415. The timing of signals CK0, $\overline{CK0}$, CK3 and CK4 is substantially independent of the measurement signal 68.

The pressure sensing capacitors 53 and 57 are excited by signal CK0 which has a 180 degree phase relationship with the signal $\overline{CK0}$ which excites the linearity correction capacitors 415 and 417. This phase relationship allows for compensation for undesired stray capacitance associated with pressure sensing capacitors 53 and 57. Capacitor 415 has a selected capacitance CL1 and is excited to subtract a selected quantity of charge from capacitor 53. Capacitor 417 has a selected capacitance CL2 and is excited to subtract a selected quantity of charge from capacitor 57. The quantity (CL2−CL1) is adjusted to reduce second degree non-linearity the relationship between sensed pressure and the quantity (CH−CL)/(CH+CL). The quantity (CL2+CL1) is adjusted to reduce third degree non-linearity in the relationship between sensed pressure and the quantity (CH−CL)/(CH+CL). The linearity of the transmitter output is thus improved.

The group of timing waveforms 448 of the timing diagram in FIG. 8 is representative of an example where an applied pressure P is substantially zero and the capacitance CH is substantially equal to the capacitance CL. While the measurement signal 68 is coupled to feedback means 59 at a first level 434 during the first time interval, circuit 59 repetitively actuates signal CK1 as shown at 436 to close switch 422 and couple charge packets from sensing capacitor 53 corrected by linearity correction capacitor 415 to the line 72A. While the measurement signal is coupled to the feedback means 59 at a second level during the second time interval as shown at 438, circuit 59 repetitively actuates signal CK2 as shown at 440 to close switch 424 and couple charge packets from sensing capacitor 57 corrected by linearity correction capacitor 417 to the line 76A.

The measurement means 74 comprises an integrator 442 which accumulates charge from the first and second signals during first and second time intervals respectively and provides an integrator signal 444 representative of the accumulated charge. Integrator signal 444 is coupled to an input of a Schmidt trigger or comparator 446. Schmitt trigger 446 has hysteresis between selected upper and lower triggering levels. Schmitt trigger 446 provides the measurement signal 68 on line 68A which is fed back to control feedback means 59 and charge generating means 58.

In FIG. 8, the level 441 of integrator output 444 is shown to increase as charge packets of a first polarity from the first signal 72 are applied during the first time interval until it passes the first selected level 443 ending the first time interval and starting the second time interval. The level 441 decreases as charge packets of a second polarity opposite the first polarity are applied to the integrator 442 during the second time interval.

When capacitance CL is approximately equal to three times capacitance CH as shown by another example in the group of timing waveforms 450 however, three times as many pulses 352 occur on line 61 as occur on line 60. The signals on line 60 and 61 are derived from the measurement signal 68 by the operation of feedback means 59.

A flow of charge from the first signal 72 per cycle of the measurement output is $$Q1 = (N1)(CH - CL1)(V) \qquad \text{Eq. 4}$$

where:
Q1 is the quantity of charge supplied by the first charge output during one cycle of measurement output 68;
N1 is the count or number of packets of charge provided by the first signal during one cycle of that the measurement output;
CH is the sensor capacitance CH; and
V is the reference potential.

A flow of charge from the second charge output 76 per cycle of the measurement signal is $$Q2 = (N2)(CL - CL2)(V) \qquad \text{Eq. 5}$$

where
Q2 is the quantity of charge supplied by the second signal during one cycle of measurement output 68;
N2 is the count or number of charge packets provided by the second signal during one cycle of the measurement signal;
CL is the sensor capacitance CL; and
V is the reference potential.

The equations 4 and 5 for charge quantities Q1 and Q2 are approximations which do not take into account a "least count" error in counting pulses. However, over a large number of measurement cycles, such least count errors tend to cancel out one another. The integrator is never zeroed and; hence, portions of charge packets that drive the integrator beyond a selected level of the Schmitt trigger are carried over to the next time interval. With this carry over of charge, the summation of charges Q1 equal substantially the summation of charges Q2 over a long time interval T comprising many measurement cycles and; hence, $$(M1)(CH') = (M2)(CL') \qquad \text{Eq. 6}$$

where:
CH' is the corrected capacitance (CH−CL1); is the corrected capacitance (CL−CL2);
M1 is the number of pulses on line 60 which is also the number of charge packets generated by the first signal during time interval T; and
M2 is the number of pulse on line 61 which is also the number of charge packets generated by the second signal during time interval T.

Terms in equation 6 can be rearranged to define a first output equation Equation 7:

$$M2 = (\tfrac{1}{2})(M1 + M2)\left(1 + \frac{CH' - CL'}{CH' + CL'}\right) \qquad \text{Eq. 7}$$

Terms in equation 6 can also be rearranged to define a second output equation Equation 8:

$$M2 - M1 = (M1 + M2)\frac{(CH' - CL')}{(CH' + CL')} \qquad \text{Eq. 8}$$

Equation 7 or Equation 8 can be used in an output circuit 78 as explained below.

Figure 9:
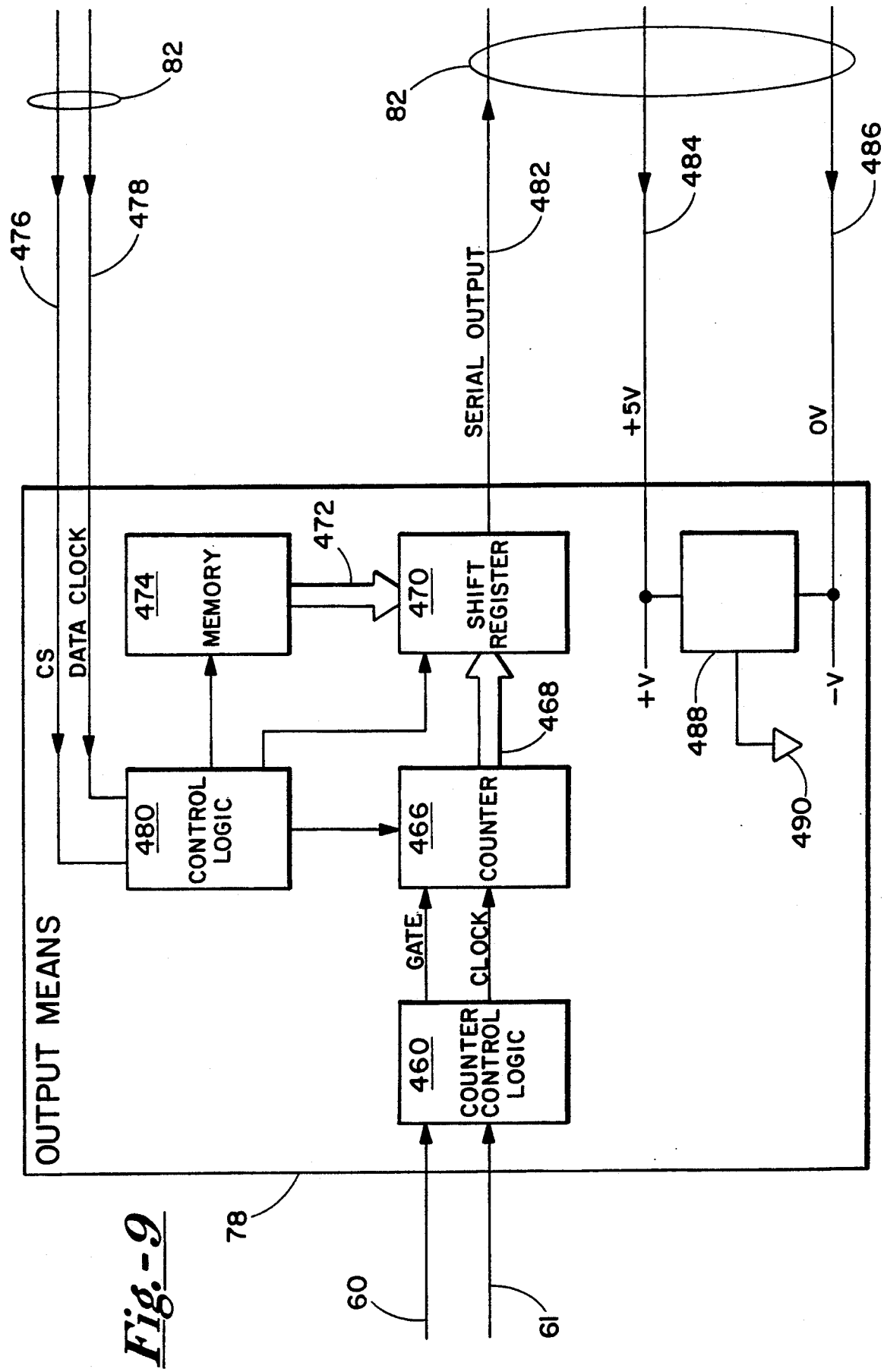
FIG. 9 is a timing diagram according to a third embodiment output means according to this invention.

In FIG. 9, an output circuit 78 which corresponds to FIG. 7 is shown. The output circuit 78 comprises a counter control logic circuit 460 which receives the previously described pulses on lines 60A and 61A and is coupled to counter 466 to control pulse counting by counter 466. The counter 466 is gated to count pulses in a time interval during which a selected number of pulses (M1+M2) corresponding to the selected time interval T are received from lines 60 and 61.

In one preferred embodiment, the counter 466 counts the number of pulses M2 received from line 61A during the time interval. The number of pulses (M1+M2) is set to a selected value, for example, 200,000 pulses, by the counter control logic 460 and; hence, the count M2 is related to the sensed pressure by Eq. 7. This counting is preferred for providing a count which is representative of an unsigned pressure variable such as a pressure which varies from zero to a full scale value.

In yet another preferred embodiment, the counter 466 is an UP/DOWN counter and counts the difference in counts (M2−M1) during the time interval T. The number of counts (M2+M1) is set to a selected value, for example, 50,000 by the counter control logic 460 and, hence, the count (M2−M1) is related to the sensed pressure by Eq. 8. This counting is preferred for providing a count which is representative of a signed pressure or variable which varies from a negative full scale value to a positive full scale value.

The count in counter 466 is representative of the sensed parameter and is transferred on parallel bus 468 to a shift register 470. Shift register 470 also receives data from a parallel bus 472 characterizing the sensor 54 which has been previously stored in a memory 474. A five-wire output data bus 82 couples a chip select or CS signal on line 476 and couples a data clock signal on line 478 both to a control logic means 480 which controls provision of parallel data from memory 474 and counter 466 to shift register 470. Control logic means 480 also controls shift register 470 to provide a serial output of the data in the shift register to line 482 of the output bus, synchronous with the data clock on line 478.

The output bus 82 provides a 5 volt reference to the transmitter along lines 484 and 486 and a MOS voltage divider 488 provides a DC common reference level 490 to the transmitter. The five-wire output bus of FIG. 9 may be coupled to a circuit such as the circuit shown in FIG. 5 to provide a 4–20 mA analog output and digital output to a two-wire loop.

Transmitter circuitry preferably comprises a custom MOS integrated circuit to provide a desired low cost, compact transmitter.

Figure 10:
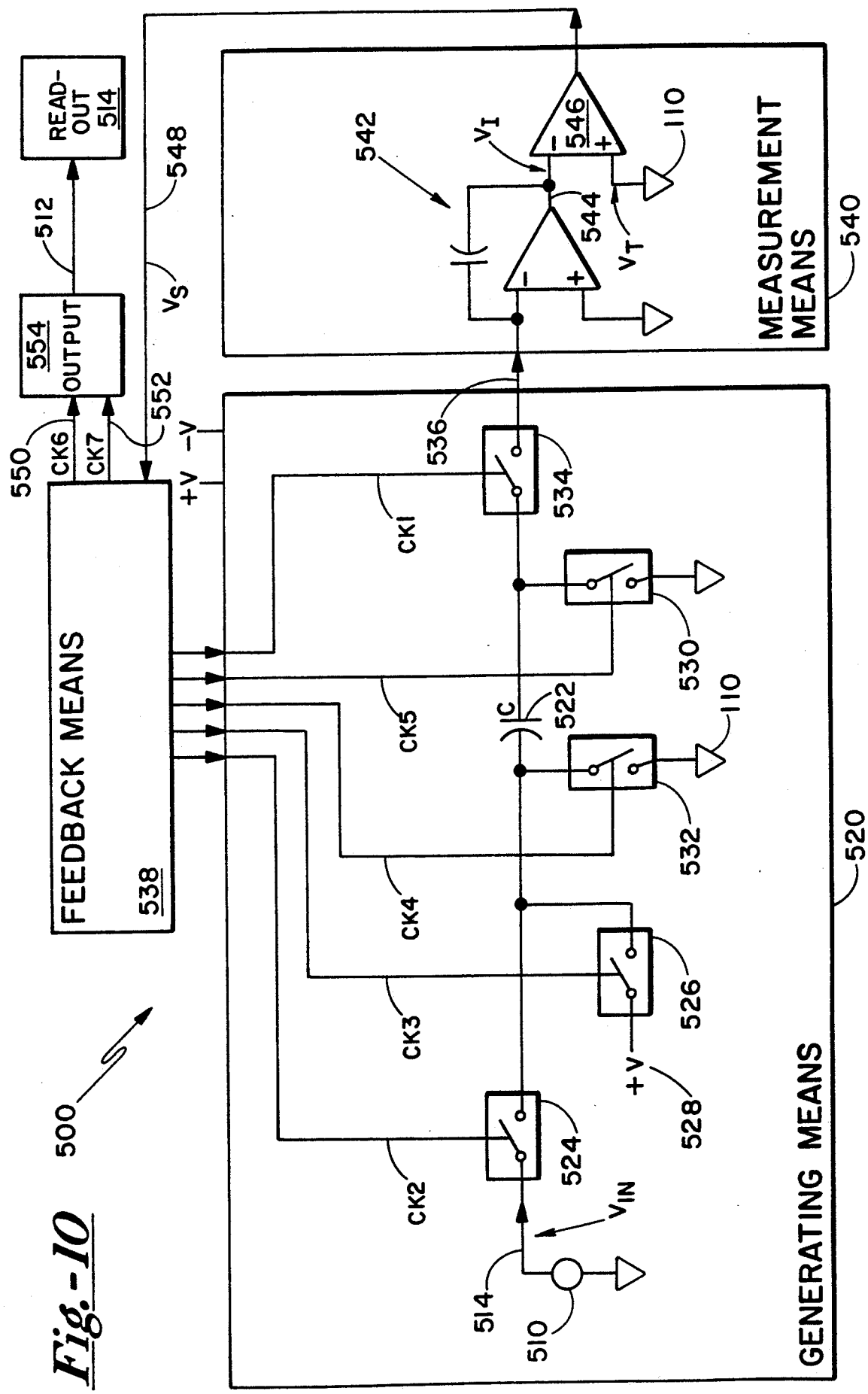
FIG. 10 is a diagram of a voltage measurement circuit according to this invention.

In FIG. 10, an embodiment of a measurement circuit 500 is shown. Measurement circuit 500 senses an input signal from a potential source 510 and provides a signal on line 512 to a readout means 514 as a function of the sensed potential on line 514. Potential source 510 is coupled to a generating means 510. Generating means 520 comprises a capacitor 522 which is a reactance means having a capacitance C. The capacitor 522 is coupled to the input signal on line 514 through a switch 524. A switch 526 couples the capacitor 522 to a reference potential 528; switches 530 and 532 couple the capacitor 522 to a second reference potential 110 which can be a DC common level. A switch 534 couples the capacitor 522 to line 536 to provide a generator signal responsive to the sensed input signal. Switches 524, 526, 530, 532, and 534 are controlled by digital signals CK2, CK3, CK5, CK4 and CK1 respectively which are feedback signals coupled from the feedback means 538. A measurement means 540 receives and measures the generator signal coupled on line 536. Integrator means 542 accumulates charge received from line 536 and provides an integrator signal on line 544 which is coupled to a comparator 546. The comparator 546 compares the integrator signal to a reference potential 110 and couples a measurement signal to line 548 which is a function of the charge coupled to the measurement signal to line 548 which is a function of the charge coupled to the measurement means on line 536. Line 548 is coupled to the feedback means 538 for controlling the feedback means 538. The feedback means 538 produces and couples the digital feedback signals CK1, CK2, CK3, CK4 and CK5 to the generating means 520. Feedback means 538 also couples digital output signals CK6 and CK7 on lines 550 and 552 respectively to an output means 554 which counts pulses on lines 550 and 552 to provide a signal on line 512 which is a function of the sensed voltage on line 514.

In FIG. 11, a timing diagram 580 shows timing relationships between the measurement signal which control the feedback means 538 and the feedback signals CK1, CK2, CK3, CK4 and CK5 which are produced by the feedback means. FIG. 11 also shows the timing relationships between the feedback signals, the integrator signal VI, and the measurement signal VS. Before the start of the timing sequence shown in FIG. 11, the switches 530 and 532 have been closed to discharge the capacitor 522 to substantially a zero potential. At 528 in FIG. 11, signals CK1 and CK2 are actuated to couple the capacitor 522 to the input potential on the line 514 and the generator output on line 536, thus coupling a packet of charge representative of the sensed voltage to the measurement means 542. The integrator 542 receives this packet of charge and the integrator output VI increases above the reference potential VT as shown at 584. Next, signals CK3 and CK5 are actuated as shown at 586 to close switches 526 and 530, thus charging capacitor 522 to the reference potential +V at 528 in FIG. 10. The signals CK1 and CK4 are then actuated as shown at 588 to couple a packet of charge as a function of the reference voltage 528 to the measurement means 540 on line 536. The signals CK3 and CK5 are actuated again as shown at 590 to again charge capacitor 522 to the reference potential, and the signals CK1 and CK4 are again actuated as shown at 592 to discharge another charge packet as a function of the reference 528 into the measurement means on line 536. The process of charging capacitor 522 to the reference potential and then discharging the charge packet into the line 536 is repeated until the integrator output drops below the reference voltage VT as shown at 594. When the integrator signal drops below the reference potential VT, the measurement output changes as shown at 596, thus triggering the feedback means to discharge the capacitor 522 as shown at 598 and couple another packet of charge representative of the sensed parameter into the measurement means 540 as shown at 600 in FIG. 11.

The number of charge packets representative of the sensed parameter which are provided on line 536 is represented by a number of pulses N1 which are produced in signal CK6 on line 550. The number of charge packets as a function of the reference potential which are provided on line 536 is represented by a number of pulses N2 which are produced in signal CK7 on line 552. The numbers N1 and N2 are related to one another since $(N1)(C)(V) = (N2)(C)(VR)$ by the following:

$$V = (N2/N1)(VR)$$

where:
 V is the input potential on line 514
 VR is the reference potential 528
 N1 is the number of pulses on line 550 during a time interval, and
 N2 is the number of pulses on line 552 during the time interval.

Hence, it can be seen that counting pulses on lines 550 and 552 by an output means such as the one described in connection with FIG. 9 can provide an output 512 which is representative of the sensed potential on line 514. The circuit 500 can be used as an analog-to-digital converter circuit for interfacing an analog signal to a digital readout means 514.

What is claimed is:

1. A measurement circuit for providing an output signal as a function of an input signal, comprising:
    generating means coupled to the input signal for providing a generator signal which is formed by a plurality of charge packets and which is a function of the input signal, the generator means including reactance means for forming the charge packets;
    measurement means coupled to the generated means for receiving the charge packets from the reactance means and measuring the generator signal to provide a measurement signal as a function thereof;
    feedback means coupled to the measurement means for providing a feedback signal to the generating means as a function of the measurement signal to control the generator means such that the generator signal tends toward a charge-balanced state; and
    output means for providing the output signal as a function of a count of a number of charge packets contained in the generator signal.

2. A measurement circuit as recited in claim 1 wherein the generating means comprises switching means controlled as a function of the feedback signal for controlling the coupling of the charge packets from the reactance means to the measurement means.

3. A measurement circuit as recited in claim 1 wherein the charge packets formed by the reactance means include a first portion of charge packets having a first polarity and a second portion of charge packets having a second polarity opposite the first polarity.

4. A measurement circuit as recited in claim 3 wherein the measurement means accumulate the charge packets contained in the generator signal for providing the measurement signal as a function of accumulated charge.

5. A measurement circuit as recited in claim 4 wherein the feedback signal controls the switching means for changing the polarity of the charge packets being coupled to the measurement means.

6. A measurement circuit as recited in claim 5 wherein the first portion comprises a first number N1 of charge packets and the second portion comprises a second number N2 of charge packets.

7. A measurement circuit as recited in claim 6 wherein the reactance means includes at least one capacitor.

8. A measurement circuit as recited in claim 6 wherein the feedback signal controls the switching means to determine the first and second numbers of charge packets N1 and N2.

9. A measurement circuit as recited in claim 8 wherein the output means provides the output signal as a function of the first number N1.

10. A measurement circuit as recited in claim 8 wherein the output means provides the output signal as a function of the first number N1 and the second number N2.

11. A measurement circuit as recited in claim 10 wherein the generating means comprises at least one reference potential coupled to the switching means.

12. A measurement circuit as recited in claim 11 wherein the reactance means includes first and second capacitances C1 and C2, and wherein the output means provides the output signal substantially as a function of the equation: $(N1)(C1)(V)=(N2)(C2)(V)$ where C1 and C2 are a function of the input signal and V is the reference potential.

13. A measurement circuit as recited in claim 11 wherein the reactance means includes first and second capacitances C1 and C2 and wherein the output means provides the output signal substantially as a function of the equation: $(N1)(C1)(V1)=(N2)(C2)(V2)$ wherein the reference potential and V2 is a function of the input signal.

14. A measurement circuit as recited in claim 7 wherein the reactance means includes a capacitance C and wherein the output means provides the output signal substantially as a function of the equation: $(N1)(C)(V1)=(N2)(C)(V2)$ wherein potentials V1 and V2 is representative of the input signal.

15. A measurement circuit as recited in claim 11 wherein the reactance means includes first and second capacitances C1 and C2 and wherein the output means provides the output signal substantially as a function of the equation: $(N1)(C1)(V)=(N2)(C2)(V)$ where C1 is a function of the input signal and C2 is a substantially fixed capacitance and V is the reference potential.

16. A transmitter for providing a transmitter output as a function of a sensed parameter, the transmitter comprising:
    generating means for providing a generator signal, as a function of the sensed parameter, which is formed by a plurality of charge packets; the generating means including reactance means for forming the charge packets;
    integrator means for receiving the charge packets formed by the reactance means and accumulating charge from the charge packets to provide an integrator output which is a function of the generator signal;
    comparator means for providing a comparator output indicating that the integrator output has passed a comparator threshold;
    feedback means for providing a feedback signal to the generating means as a function of the comparator output to control the generator means such that the charge accumulated by the integrator means tends toward charge balance; and
    output means coupled to the feedback means for providing the transmitter output as a function of a count of charge packets contained in the generator signal.

17. A transmitter as recited in claim 16 wherein the generating means comprises switching means controlled as a function of the feedback signal for controlling the coupling of the charge packets from the reactance means to the integrator means.

18. A transmitter as recited in claim 17 wherein the plurality of charge packets include charge packets having a first polarity and charge packets having a second polarity opposite the first polarity.

19. A transmitter as recited in claim 18 wherein the feedback signal controls the switching means for changing the polarity of the charge packets.

20. A transmitter as recited in claim 19 wherein during a measurement cycle the feedback signal controls the switching means so that the generator signal includes a first number N1 of charge packets of first polarity and a second number N2 of charge packets of second polarity.

21. A transmitter as recited in claim 20 wherein the reactance means includes at least one capacitor.

22. A transmitter as recited in claim 20 wherein the output means provides the output signal as a function of the first number N1.

23. A transmitter as recited in claim 22 wherein the output means provides the output signal as a function of the first number N1 and the second number N2.

24. A transmitter as recited in claim 23 wherein the generating means comprises at least one reference potential coupled to the switching means.

25. A transmitter as recited in claim 24 wherein the reactance means includes first and second capacitances C1 and C2, and wherein the output means provides the output signal substantially as a function of the equation: (N1)(C1)(V)=(N2)(C2)(V) where C1 and C2 are a function of the sensed parameter and V is the reference potential.

26. A transmitter as recited in claim 24 wherein the reactance means includes first and second capacitances C1 and C2, and wherein the output means provides the output signal substantially as a function of the equation: (N1)(C1)(V1)=(N2)(C2)(V2) wherein V1 is a reference potential and V2 is a potential as a function of the senses parameter.

27. A transmitter as recited in claim 20 wherein the reactance means includes a capacitance C, and wherein the output means provides the output signal substantially as a function of the equation: (N1)(C)(V1)=(N2)(C)(V2) wherein at least one of potentials V1 and V2 is a function of the sensed parameter.

28. A transmitter as recite din claim 24 wherein the reactance means includes first and second capacitances C1 and C2 and wherein the output means provides the output signal substantially as a function of the equation: (N1)(C1)(V)=(N2)(C2)(V) wherein C1 is a function of the input signal and C2 is a substantially fixed capacitance and V is the reference potential.

29. A transmitter as recited in claim 16 wherein the transmitter further comprises sensor means coupled to the generator means for sensing the parameter.

30. A transmitter as recited in claim 29 wherein the parameter sensed by the sensor means is a pressure.

31. A transmitter as recited in claim 30 wherein the sensor means is a capacitive pressure sensor.

32. A transmitter as recited in claim 31 wherein the sensor means is a dual plate capacitive pressure sensor.

33. A transmitter as recited in claim 30 wherein the sensor means comprises a resistive bridge sensor.

34. A transmitter as recited in claim 32 and further comprising means coupled to the dual plate capacitive sensor for correcting for stray capacitance, thereby improving performance of the transmitter.

35. A transmitter as recited in claim 29 wherein the output means provides the transmitter output as a serial digital output signal representative of the sensed parameter.

36. A transmitter as recited in claim 29 wherein the output means provides the transmitter output as a current output signal representative of the sensed parameter.

37. A transmitter as recited in claim 36 wherein the transmitter is energized by a two-wire current loop receiving the current output signal.

38. A transmitter as recited in claim 37 wherein the output means also couples a serial digital signal representative of the sensed parameter to the loop.

39. A transmitter as recited in claim 38 wherein the transmitter is controlled by a serial digital command received from the loop.

40. A transmitter as recited in claim 29 wherein the transmitter is energized by a two-wire circuit and the output means provides the transmitter output as a digital signal representative of the sensed parameter to the two-wire circuit.

41. A transmitter as recited in claim 40 wherein the digital signal is a serial signal.

42. A circuit for providing an output signal as a function of an input signal, comprising:
generating means coupled to the input signal for providing a generator signal which is formed by a plurality of charge packets and which is a function of the input signal, the generating means including:
reactance means for forming the charge packets; and
switching means actuable for coupling the charge packets from the reactance means to a generator output to provide the generator signal;
measurement means coupled to the generating means for receiving the charge packets and measuring the generator signal to provide a measurement signal as a function thereof;
feedback means coupled to the measurement means for actuating the switching means as a function of the measurement signal; and
output means for providing an output signal representative of a count of a number of charge packets contained in the generator signal.

43. A circuit for providing an output as a function of an input signal, comprising:
generating means for providing a generator signal which is formed by a plurality of charge packets and which is a function of the input signal, the generating means including reactance means for forming the charge packets;
measurement means for receiving the charge packets and providing a measurement signal as a function of the generator signal;
comparator means for providing a comparator output indicating that the measurement signal has passed a first comparator threshold;
feedback means for providing a feedback signal to the generating means as a function of the comparator output to control the generator means such that the generator signal tends toward a charge-balanced state; and
output means for providing an output signal as a function of a count of the number of charge packets.

44. A measurement circuit for providing a measurement output as a function of a process variable, comprising:
sensing means forming a first number of charge packets having a first polarity and a second number of charge packets having a second polarity opposite the first polarity, each of such packets comprising a quantity of charge, the quantity of charge in at least some of the packets being a function of the process variable;
integrator means for receiving the charge packets and providing an integrator output representative of the quantities of charge received;

control means for controlling the first and second numbers of charge packets as a function of the integrator output such that the quantity of charge received by the integrator means is balanced; and output means for providing an output as a function of a ratio of the first and second numbers.

45. A measurement circuit for providing a measurement output as a function of a process variable, comprising:

first reactance means for forming a first number of charge packets as a function of the process variable;

second reactance means for forming a second number of charge packets substantially independent of the process variable;

integrator means for receiving the charge packets and providing an integrator output representative of an accumulated quantity of charge received;

control means for controlling the first and second numbers as a function of the integrator output such that the accumulated quantity of charge received by the integrator means tends toward a balance; and output means for providing an output representing the process variable as a function of the first and second numbers.

46. A measurement circuit for providing a measurement output as a function of a process variable, comprising:

means for providing a DC potential which varies as a function of the process variable;

means for forming a first number of charge packets having a first polarity and a second number of charge packets having a second polarity opposite the first polarity, each of such packets comprising a quantity of charge, the quantity of charge in at least some of the packets being a function of the DC potential;

integrator means for receiving the charge packets and providing an integrator output representative of an accumulated quantity of charge;

control means for controlling the first and second numbers as a function of the integrator output such that the accumulated quantity of charge tends to be balanced; and output means for providing an output representative of the process variable as a function of a ratio of the first and second numbers.

47. A circuit for providing an output signal as a function of an input signal, the circuit comprising:

reactance means for forming positive and negative charge packets, at least some of the charge packets having a quantity of change which varies as a function of the input signal;

means for storing charge from the charge packets;

means for altering polarity of the charge packets being provided to the means for storing when an amount of charge stored passes a threshold, so that quantities of positive and negative charge provided to the means for storing tends toward a balanced state; and means for providing the output signal bases upon a count of charge packets provided to the means for storing.

48. A circuit for providing an output signal which is a function of magnitude of an input signal, the circuit comprising:

means for forming positive and negative charge packets, at least some of the charge packets having a charge whose quantity is representative of the magnitude of the input signal;

means for storing the charge it receives from said charge packets;

means for selecting the charge packets to be provided to the means for storing so that over time no net charge accumulates in the means for storing;

means for counting numbers of charge packets provided to the means for storing; and means for providing the output signal based upon at least one of the counted numbers of charge packets.

49. A method of providing an output signal which is a function of a variable input, the method comprising:

forming at least one first charge packet having a charge which is a function of the variable input;

forming at least one second charge packet of opposite polarity which is not a function of the variable input; and selectively transferring the first and second charge packets to a charge accumulator until a charge balance state is passed;

counting number of first and second charge packets that are transferred to the charge accumulator during a plurality of measurement cycles; and providing the output signal based on the counted numbers.

* * * * *